United States Patent [19]

Killmon

[11] 4,140,081
[45] Feb. 20, 1979

[54] SELF-CLEANING BIRDHOUSE

[76] Inventor: Thomas D. Killmon, Rte. No. 1, Council Bluffs, Iowa 51501

[21] Appl. No.: 731,355

[22] Filed: Oct. 12, 1976

[51] Int. Cl.² ............................................. A01K 31/00
[52] U.S. Cl. .................................................. 119/23
[58] Field of Search ......................... 119/23, 45 R, 50

[56] References Cited

U.S. PATENT DOCUMENTS

| | | | |
|---|---|---|---|
| 1,923,980 | 8/1933 | Holtine | 119/45 R |
| 2,612,864 | 10/1952 | Kummeth | 119/45 R |
| 3,592,169 | 7/1971 | Killmon | 119/23 |

*Primary Examiner*—Hugh R. Chamblee

*Attorney, Agent, or Firm*—Hiram A. Sturges

[57] ABSTRACT

A self-cleaning birdhouse comprising an inner wall supported by a post and to which is attached one or more nesting compartment assemblies each containing one or more nestng compartments, each nesting compartment having a forward wall, a top, side walls, and a floor, each compartment assembly being moveably mounted on the inner wall in a manner so that the compartment assembly can be caused to swing outwardly so that its floor inclines for dumping nesting materials down between a space created between the floor and the inner wall for the disposing of used nesting materials at the end of the nesting season.

4 Claims, 3 Drawing Figures

SELF-CLEANING BIRDHOUSE

FIELD OF THE INVENTION

This invention is in the field of birdhouses and particularly those which are designed with moveable portions for facilitating the dropping out of nesting materials.

DESCRIPTION OF THE PRIOR ART

The proper care of birdhouses requires the cleaning out of old nesting materials between nesting seasons.

It is important that this cleaning out of nesting materials be done with convenience. In national parks where birdhouses are used on a large scale the clean-out labor is a very significant factor. It is, therefore, an object of this invention to provide a birdhouse adapted to be mounted high in the air on a post and which can be actuated by a long pole with a hook on it and by a pulling motion applied to a loop in the birdhouse assembly, causing the birdhouse parts to move into a position for dumping nesting materials downwardly by gravity from the nesting compartments thereof.

In my earlier patent for this purpose, compartments with sliding walls resembling the drawers of a desk were provided with the side walls of the drawers sliding across the floors thereof and outwardly as a desk drawer pulls outwardly therefrom so that nesting materials could fall downwardly. However, I have found that the construction of my previous patent was costly and that the construction of the concept of this invention is much more economical and more effective.

SUMMARY OF THE INVENTION

A particular object is to provide a self-cleaning bird house comprising an upright frame-wall bounded on each side by first and second compartment assemblies which latter each provide all sides and top and bottom of one or more bird nesting compartments with the exception of an inner wall thereof which is provided by the upright frame-wall which serves as the inner wall for the compartments of each of the compartment assemblies, each compartment assembly being moveably mounted on the frame-wall for movement outwardly therefrom so that floors could thereof incline with the respect to the horizontal downwardly at their inner sides for dumping nesting materials down between the space created for dumping between such floors and the inner frame-wall for the disposing of used nesting materials at the end of the nesting season.

A further object is to provide for the attachment of the nesting compartment assemblies to the frame-wall by means of hinges at their top so that they swing outwardly at their bottom freely when desired.

Still another object is to provide levers attached to the nesting compartments and arrange so that a simultaneous down pulling on the levers will cause the nesting compartment assemblies to swing outwardly at their lower ends on said hinges for making dumping possible.

Still another object is to provide the concept of having a common harness attached to each of the levers and terminating in a loop so that an operator can reach the loop with a hook on the end of a pole and pull downwardly on the loop for actuating the bird house into dumping position even though the bird house might be high in the air and reachable from the ground only with a long pole.

DESCRIPTION OF THE PREFERRED EMBODIMENTS

Figure 1:
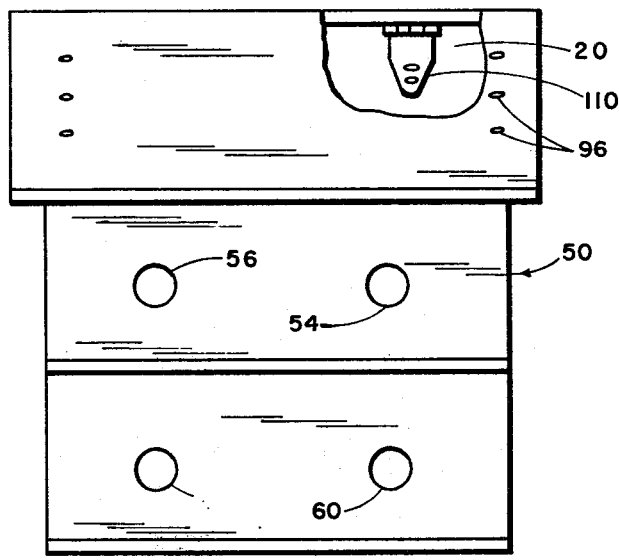
FIG. 1 is a frontal elevation of the birdhouse of this invention, shown with a portion broken away to illustrate the position of one of the hinges.
Figure 3:
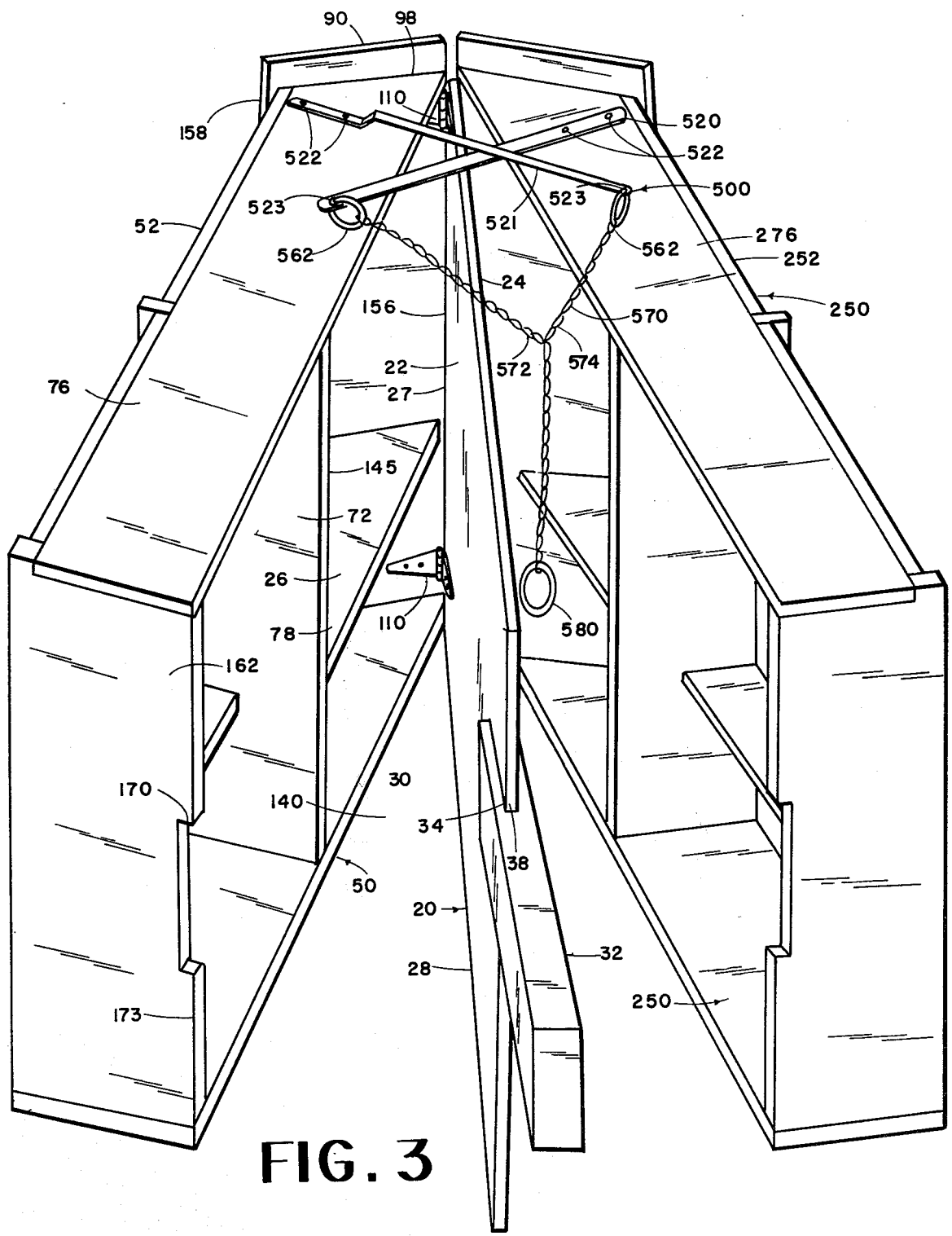
FIG. 3 is a perspective view of the birdhouse of FIG. 1 as it would be seen looking upwardly and at one side thereof at a time when the compartment assemblies are in outwardly disposed positions for the dumping of nesting materials from the floor members of the compartment assemblies, only an upper portion of a supporting post being shown. The cord portion of the dumping control assembly is shown in slack condition, although it would be normally taut and pulled downwardly whenever the compartment assemblies are being held outwardly.

The self-cleaning bird house of this invention is generally indicated at 10 in FIG. 1 and comprises a frame, 20, having a first upright frame-wall which can be formed of a piece of three quarter inch plywood, for example, or by it has flat vertical surfaces defining first and second upright frame-walls, 22 and 24 seen in FIG. 3. Each of the frame-walls, 22 and 24, also define inner walls of compartments and a bird nesting compartment is shown in FIG. 3 at 26 and can be called a first compartment whereby a portion of the first upright frame wall which is adjacent to the first compartment 26 can be called a first compartment inner wall and therefore that latter portion of the first frame-wall 22 is given the numeral 27.

The frame 20 therefore comprises an upper frame member 28 of sheet material and a lower frame member 40, which is a post and which can be 10 feet long, 15 feet long or any length, the post being shown at 32 and having a notch 34 in its upper end receiving the central part of the lower edge 36 of the upper frame member 28 snugly, and being secured thereto such as with glue or other securing means.

A first compartment assembly generally is indicated at 50 and comprises an outer wall 52, having at least one entry opening there through such as a first entry opening 54 which can be one of many entry openings through the wall 52, other entry openings being shown at 56, 58 and 60, all in FIG. 1, each entry opening being of the size for the passage of birds there through and each extending substantially horizontally through the outer wall 52.

The outer wall 52 is normally upright as shown in FIG. 1 and this invertical parallelism with the sides 22 and 24 of the upper frame member 28 of FIG. 3.

Figure 2:
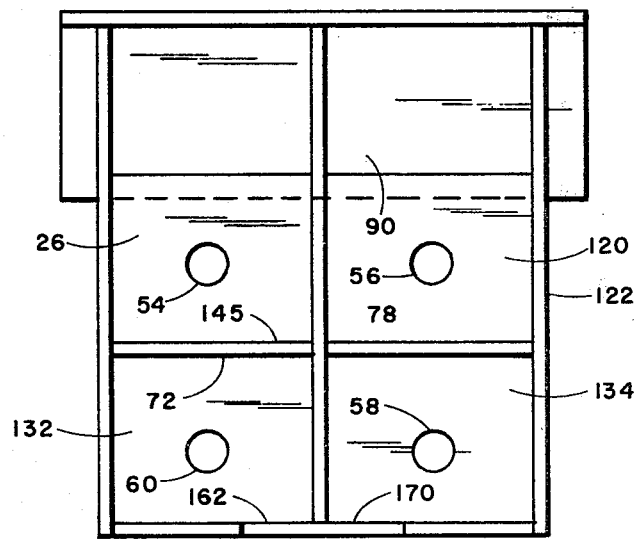
FIG. 2 is a view of one of the two compartment assemblies of the invention, shown as it would be seen from the innerside before hinges and dumping assembly control bars are mounted thereon.

The first compartment assembly 50 has a first floor member 72, attached to the outer wall 52, and extending transversely thereto and extending away from an inner side thereof, horizontally for example. The first compartment assembly 50 has left and right end walls 76 and 78, as seen in FIGS. 2 and 3, which latter a horizontally space from each other and extend upwardly from the first floor member 72 and are disposed on opposite sides of the first entry opening 54 of FIG. 1, the end walls 76 and 78 being attached to the forward wall 52 and to the first floor member 72 in suitable manner.

The first compartment assembly 50 further has a top member 90, extending transversely to the outer wall 52 and attached thereto in suitable manner and also attached to the end walls 76 and 78 in suitable manner. Attachments throughout the bird house can be glue or nails or both and sample nails serving to illustrate this point for all attachments of compartment assembly portions to adjacent compartment assembly portions are seen in FIG. 1 at 96.

A sample of glue can be indicated by the numeral 98 in FIG. 3 for attaching the top member 90 to the end wall 76.

The top wall 90 is disposed vertically spaced above the first floor member 72 whereby a first nesting compartment 26 previously described, is defined and is bounded by the end walls 76 and 78 and by the first floor member 72 and by the top member 90.

As best seen in FIGS. 2 and 3, the first compartment assembly 50 can have a compartment 120 horizontally spaced on the opposite side of the end wall 98 from the compartment 26, or the compartment 120 being called the second nesting compartment and an extra vertical wall 122 can be provided serving as the opposite vertical end wall for the second compartment 120, that is opposite from the wall 78.

Likewise other compartments 132 and 134 can be disposed beneath the compartments 26 and 120 respectively, all being part of the same first compartment assembly 50, if desired.

The first compartment assembly 50 is attached to the first upright frame-wall represented by the side 22 of the upper frame member 28 by means of a pair of hinge assemblies 110 horizontally spaced on the underside of the top member 90, whereby the compartment assembly 50 is normally in a nesting position with its forward wall 52 in vertical position and the inner edges of the various walls such as the end walls, 76 and 78, and the top wall 90 and the first floor member 72, are all disposed in the vertical plain adapted to closely abut the first compartment inner wall 27 and the hinges 110 hold the first compartment assembly 50 in the nesting position as described whereby the first upright frame wall 30 serves as an inner wall for the compartment 26 and whereby the first compartment assembly 50 can be moved outwardly since the hinges 110 are on the same horizontal hinging axis so that the first floor member 72 can move away from the first upright frame wall 22 into the dumping position shown in FIG. 3 for providing a dumping space 140 between the first floor member 72 and the first upright frame-wall 22, through which dumping space nesting materials can fall for cleaning out the first compartment 26.

The first floor member 72 has an upper surface 145, seen in FIG. 2, which latter is sufficiently near to the horizontal at times when the bird house is in the nesting position with the inner edge of its first floor member 72 against the first upright frame-wall 22 that when the first compartment assembly 50 is then moved to a dumping position inclining outwardly generally at an acute angle with respect to the planar upright frame-wall 22, as best shown in FIG. 3, then the first floor member 72 will have it's upper surface 145 slanting downwardly for dumping on that side thereof which is closest to the upright frame-wall 22 so that nesting materials can slide downwardly across the upper surface 145 to fall downwardly through the dumping space 140 for the cleaning of the bird house.

The first floor member 72 has its upper surface 145 of a planar shape for convenience of manufacture since ordinary boards can then be used for the upper floor member 72.

Referring now to FIG. 3, it will be seen that the top wall 90 can be inclined downwardly from it's inner side 156 to its outer side 158, so as to shed water in the manner of a roof.

When a first compartment assembly 50 has multiple compartments, it is possible for the first compartment assembly 50 to have an extra floor member 162 spaced beneath the floor member 72 for serving as a bottom wall of the compartments 132 and 134 of FIG. 2.

When it is desired for the floor member 162 to be at the same level as the post 32, then a notch 170 can be disposed in the extra floor member 162 so as to receive a portion of the post 32 to allow the inner edge 173 of the extra floor member 162 to abut the first upright frame-wall 22.

In FIG. 3 a second compartment assembly 250 is there shown and it can have all of its parts identical to the parts of the first compartment assembly 50 with the exception that they are mirror images of the latter so that an outer wall 252 of the second compartment assembly 250 faces outwardly and is disposed space from the upper frame member 28.

The second nesting compartment assembly 250 has an end wall 276 therefore which has thereon a bar 520 of a dumping control assembly 500. The bar 520 is fixed to the end wall 276 by bolts 522 and a bar 520 extends slightly downwardly with regard to the horizontal having a lower end lapping across the side of the end wall 76 at times when the parts are in the nesting position.

As thus described it will be seen that the bar 520 extends across the first and second upright frame-walls 22 and 24 and likewise a bar 521 is secured by bolts 522 on the end wall 76 of the first compartment assembly 50, and is rigidly fixed thereto in a non-moving manner. Each of the bars or levers 520 and 521 are provided with openings 523 in their outer ends in which loops 562 of a harness, generally indicated at 570, are secured, the loops 562 each being connected to a strand 572 or 574 of the harness 570 and the strands lead downwardly to a loop 580 which can be reached by a hook, not shown, on a pole, not shown, held by an operator who is standing on the ground so that the operator can pull downwardly on the loop 580 for causing the compartments 50 and 250 to swing outwardly into dumping positions.

If desired, the pole can be pulled upwardly and downwardly a few times if nesting materials need to be shaken out. But the slant downwardly at the inward ends of the floor members of the compartment assemblies at times when the compartment assemblies are in the dumping positions, shown in FIG. 3, will assure that the nesting materials will slide downwardly across the floor members and fall to the ground.

As thus described an easily cleaned birdhouse is provided.

I claim:

1. A self-cleaning bird house for mounting at the top of a high post comprising: a frame having a first upright frame-wall defining a first compartment inner wall, a first compartment assembly comprising an outer wall having at lease one entry opening through it for the passage of birds, said outer wall being normally upright, said first compartment assembly having a first floor member attached to said outer wall and extending transversely thereto and extending away from an inner side thereof, said first compartment assembly having left and right end walls horizontally spaced from each other and extending upwardly from said first floor member and attached thereto and disposed on opposite sides of said entry opening, said first compartment assembly having a top member extending transversely to and attached to said outer wall and extending inwardly from said outer wall and disposed vertically spaced above said first floor member, whereby a first nesting compartment is defined and is bounded by said end walls and by said first floor member and by said top member, means moveably attaching said first compartment assembly to said first upright frame-wall in a manner for holding said compartment assembly in a nesting position closely adjacent to said first upright frame-wall so as to use said first upright frame-wall as the inner wall of said first nesting compartment whereby said first compartment assembly can be moved with respect to said first upright frame-wall so that said first floor member can move away from said first upright frame-wall into a dumping position providing a dumping space between said first floor member and said first upright frame-wall through which dumping space nesting materials can fall, said first floor member having an upper surface sufficiently near to the horizontal at times when said bird house is in said nesting position that when said first compartment assembly is in dumping position said first floor member upper surface will slant downwardly towards that side thereof which is closest to said first upright framewall so that nesting materials can slide downwardly thereacross to fall downwardly through said dumping space for the cleaning of said birdhouse, said means for moveably attaching said first compartment assembly to said first upright frame wall comprising hinge means permitting said compartment assembly to pivot about a substantially horizontal axis, said axis being disposed adjacent the top of said first compartment assembly whereby a pivoting of said first compartment assembly about said axis in one direction will cause said first floor member to move away from said first upright frame-wall for creating said dumping space, an elongated dumping lever having one end fixed to said first compartment assembly in a manner such that motion of said lever with respect to said first compartment assembly is limited, said lever extending transversely to said axis and projecting a substantial distance across a vertical plane disposed in alignment with said axis so that downward pulling on said lever will cause said first nesting assembly to move to said dumping position.

2. The self-cleaning birdhouse of claim 1 in which a second compartment assembly similar to said first compartment assembly is disposed on an opposite side of said first upright frame-wall from said first compartment assembly, and a second hinge means similar to said first described hinge means connecting said second compartment assembly to said first upright frame-wall in a manner for pivoting about a second axis at the top of said second compartment assembly.

3. The self-cleaning birdhouse of claim 1 in which a second compartment assembly similar to said first compartment assembly is disposed on an opposite side of said first upright frame-wall from said first compartment assembly, and a second hinge means similar to said first described hinge means connecting said second compartment assembly to said first upright frame-wall in a manner for pivoting about a second axis at the top of said second compartment assembly, and a second dumping lever attached to said second compartment assembly at one end thereof in a manner such that motion of said second dumping lever with respect to said second compartment assembly is prevented, said second dumping lever extending transversely to said second axis and lapping across said first upright frame-wall and also extending beyond said first upright frame-wall a substantial distance whereby a downward force applied on that end of said second dumping lever which extends beyond said first upright framewall will cause said second compartment assembly to pivot about said second axis from a rest position with its lower end adjacent said first upright frame-wall and outwardly from said first compartment inner wall to a dumping position of said second compartment of said assembly in which the lower end of the latter is spaced from said first upright framewall.

4. The self-cleaning birdhouse of claim 3 in which a common harness is attached to each of said levers whereby said harness can be pulled downwardly in a manner for causing the attached portions of said harness to pull downwardly on said levers.

* * * * *